(12) United States Patent
Daab

(10) Patent No.: US 10,886,717 B2
(45) Date of Patent: Jan. 5, 2021

(54) ELECTRICAL OUTLET INCORPORATING A CHARGER FOR ELECTRONICS DEVICES AND A COVER PLATE THEREFOR

(71) Applicant: Bryan Daab, Aviston, IL (US)

(72) Inventor: Bryan Daab, Aviston, IL (US)

( * ) Notice: Subject to any disclaimer, the term of this patent is extended or adjusted under 35 U.S.C. 154(b) by 0 days.

(21) Appl. No.: 16/582,210

(22) Filed: Sep. 25, 2019

(65) Prior Publication Data
US 2020/0099209 A1  Mar. 26, 2020

Related U.S. Application Data

(60) Provisional application No. 62/736,131, filed on Sep. 25, 2018.

(51) Int. Cl.
| | | |
|---|---|---|
| *H02G 3/14* | (2006.01) | |
| *H02G 3/18* | (2006.01) | |
| *H02G 3/12* | (2006.01) | |
| *H02G 3/10* | (2006.01) | |
| *H02G 3/08* | (2006.01) | |

(52) U.S. Cl.
CPC ............... *H02G 3/18* (2013.01); *H02G 3/081* (2013.01); *H02G 3/10* (2013.01); *H02G 3/126* (2013.01); *H02G 3/14* (2013.01)

(58) Field of Classification Search
CPC .................. H02G 3/14; H02G 3/088
See application file for complete search history.

(56) References Cited

U.S. PATENT DOCUMENTS

| | | | | |
|---|---|---|---|---|
| 7,271,339 B2* | 9/2007 | Dinh | ........................ | H02G 3/14 174/53 |
| 7,528,323 B2* | 5/2009 | Wu | ........................ | H01R 13/72 174/66 |
| 8,203,077 B2* | 6/2012 | Honeycutt | ............... | H02G 3/32 174/66 |
| 8,864,517 B2* | 10/2014 | Cohen | .................... | G06F 1/1632 439/536 |
| 9,252,610 B2* | 2/2016 | Chen | ..................... | H02J 7/0042 |
| 10,340,722 B2* | 7/2019 | Rohmer | ................ | H02J 7/0044 |
| 2011/0070773 A1* | 3/2011 | Wirtz | .................... | H01R 25/006 439/527 |
| 2014/0362559 A1* | 12/2014 | Chien | ..................... | F21S 8/033 362/95 |
| 2015/0129722 A1* | 5/2015 | Green | ................... | H02J 7/0044 248/51 |
| 2015/0340826 A1* | 11/2015 | Chien | .................... | H01R 27/02 439/490 |
| 2015/0380886 A1* | 12/2015 | Oosterman | .......... | H01R 13/506 439/639 |
| 2018/0303002 A1* | 10/2018 | Liao | ........................ | H02G 3/14 |
| 2020/0295801 A1* | 9/2020 | Cyzen | ................... | H04B 3/542 |

* cited by examiner

*Primary Examiner* — Hung V Ngo
(74) *Attorney, Agent, or Firm* — Sandberg Phoenix & von Gontard P.C.

(57) ABSTRACT

An electrical outlet cover plate (10) sized to fit over the front of an electrical outlet. The cover plate has openings (18, 20) for accessing electrical receptacles (12, 14). A slot (24) extends vertically along one side of the cover plate and facilitates installation of an electronic device charger (26) and its associated cord (34) in the outlet. A plate (38) covers the slot and has a projection (42) formed thereon through which an outer end of the cord extends with a connector (36) on the outer end of the cable attaching to an electronic device for charging the electronic device.

6 Claims, 4 Drawing Sheets

ELECTRICAL OUTLET INCORPORATING A CHARGER FOR ELECTRONICS DEVICES AND A COVER PLATE THEREFOR

REFERENCE TO RELATED APPLICATIONS

This application is based on, and claims the benefit of, U.S. provisional patent application 62/736,131 filed Sep. 25, 2018, the contents of which are incorporated herein by reference.

BACKGROUND OF THE INVENTION

This invention relates to chargers for electronic devices such as cell phones, iPads, Personal Digital Assistants (PDAs) and similar personal electronic devices; and, more particularly to an electrical outlet housing a charger and an associated cover plate for the outlet. The outlet allows a person to conveniently charge a personal electronic device using the outlet in their home, office, or other convenient location.

Personal electronic devices are now commonplace. As is well-known, such devices periodically need to be recharged and various types of charging stations for doing this are now found in automobiles, restaurants, airports, and many other facilities. To use them, the user merely needs to connect their device to an outlet particularly designed for connection with the device.

While these stations are convenient to use, in a person's home or office, in order to charge a device it is often necessary to connect a charging adapter to an electrical outlet and connect the device to the adapter. If the adapter is lost, misplaced, or otherwise not available, then charging the device may not be possible. The present invention overcomes this limitation by providing a charging capability with the electrical outlet, thereby eliminating the need for an adapter in order to charge one's electronic device.

BRIEF SUMMARY OF THE INVENTION

The present invention is directed to a two-receptacle type electrical outlet such as those found in homes, offices, and elsewhere where people live, work, shop, socialize, etc., and a cover for the outlet The outlet houses a charger for electronic devices and its associated cord. The cover is sized to fit over the outlet and provide an opening through which the cord extends for connection to an electronic device being charged.

The cover includes a slot from which extends a charger's cord, the cord having an electrical, magnetic, or other type connector which conveniently connects to a user's electronic device for recharging the device when it is connected to the charger. When the device is charged, the user disconnects it from the cord which is a retractable cable. A charger installed in the slot converts AC voltage supplied to the outlet to a DC voltage of a level appropriate for charging personal electronic devices. The cover plate otherwise exposes two conventional three-prong electrical receptacles for use with a conventional two or three prong connector for providing electricity to other appliances. The charger cable extends from the slot which is adjacent the electrical receptacles.

The cover is a low cost cover, easy to install and convenient to use.

Other objects and features will be in part apparent and in part pointed out hereafter.

BRIEF DESCRIPTION OF THE SEVERAL VIEWS OF THE DRAWINGS

The accompanying figures, together with detailed description which follows, form part of the specification and illustrate the various embodiments described in the specification.

Corresponding reference characters indicate corresponding parts throughout the several views of the drawings.

DETAILED DESCRIPTION OF INVENTION

Figure 1:
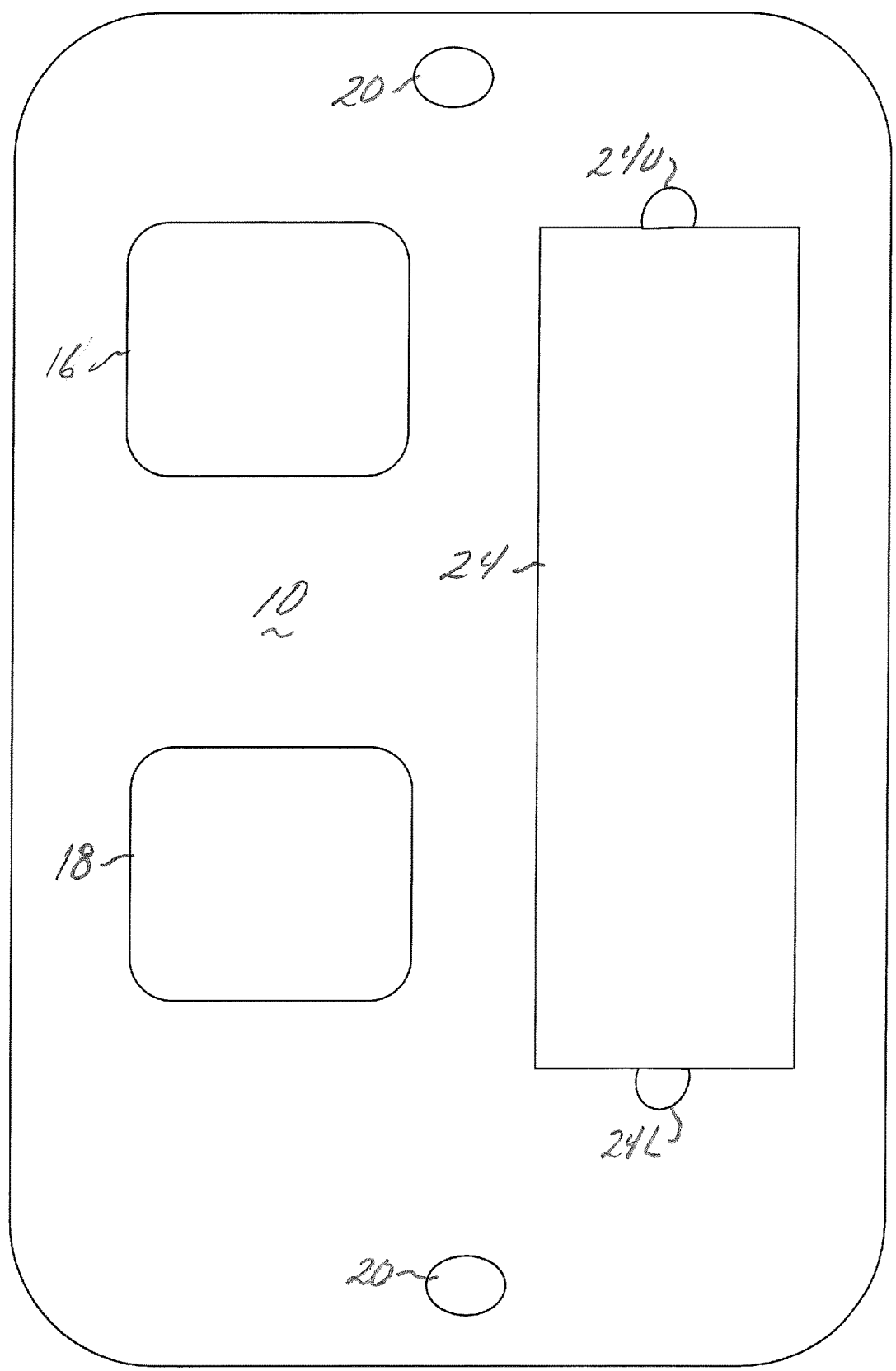
FIG. 1 is a front elevation view of the cover plate of the present invention.
Figure 2:
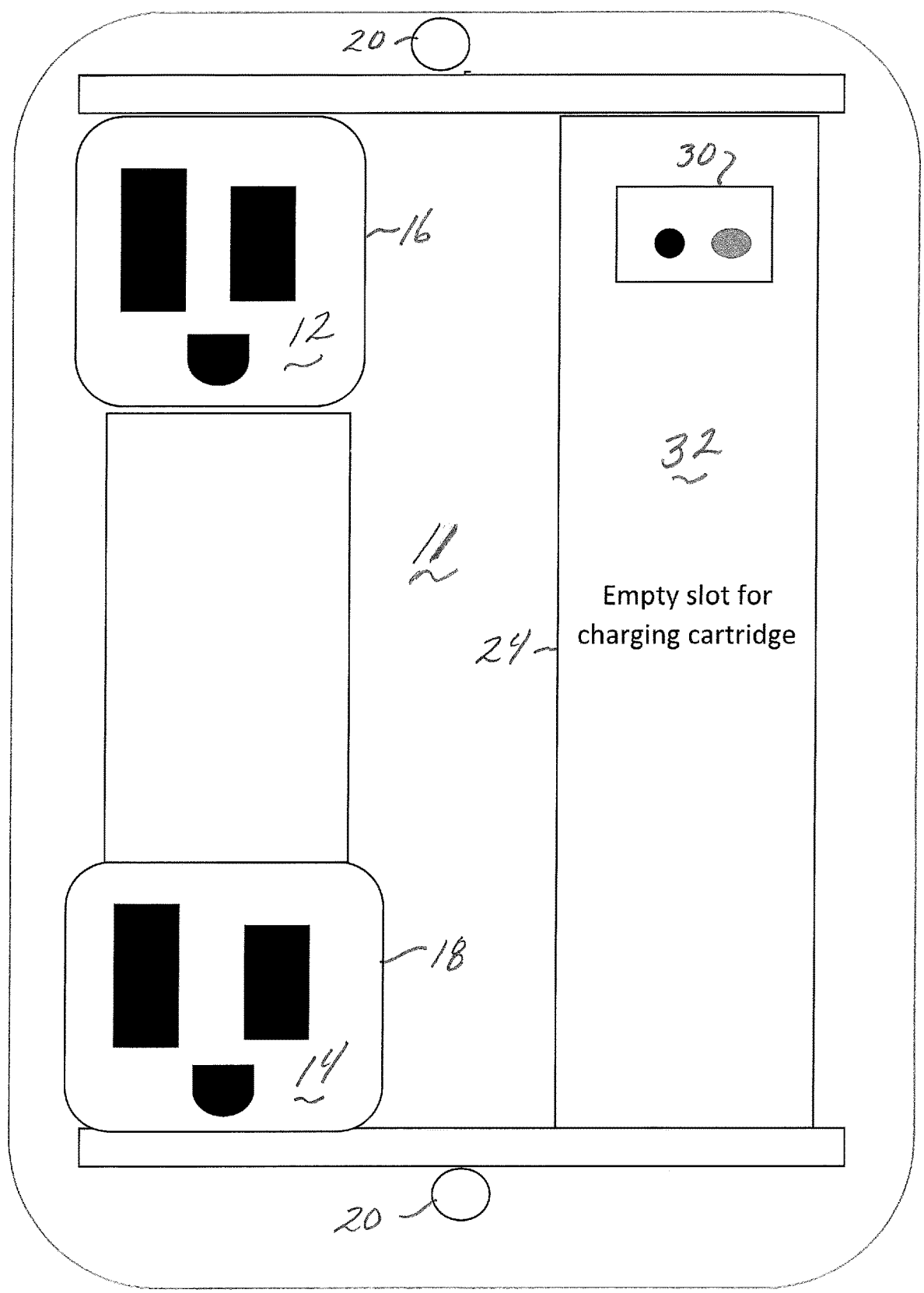
FIG. 2 is a front elevation view of an electrical outlet in which a charger is installed.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to FIG. 1, a cover plate 10 is for use on electrical outlets 11 such as found in homes, offices and other locations. Cover plate 10 is sized to fit over an opening in a wall where an outlet 11 is installed to cover the opening made in the wall for the outlet and can readily replace a conventional cover plate used with the outlet. The cover plate is made of plastic or metal. Electrical outlet 11 includes two three-prong electrical receptacles 12 and 14 respectively, and cover plate 10 includes respective openings 16, 18 formed in it to expose these receptacles when the cover plate is installed. A plug (not shown) for an electrical appliance (lamp, television, computer, etc.) fits into one of the receptacles 12, 14 to connect the appliance to a source of electricity. The cover plate has openings 20 at its upper and lower ends for attachment of cover plate 10 to the electrical outlet using screws 22, see FIG. 3.

Figure 4:
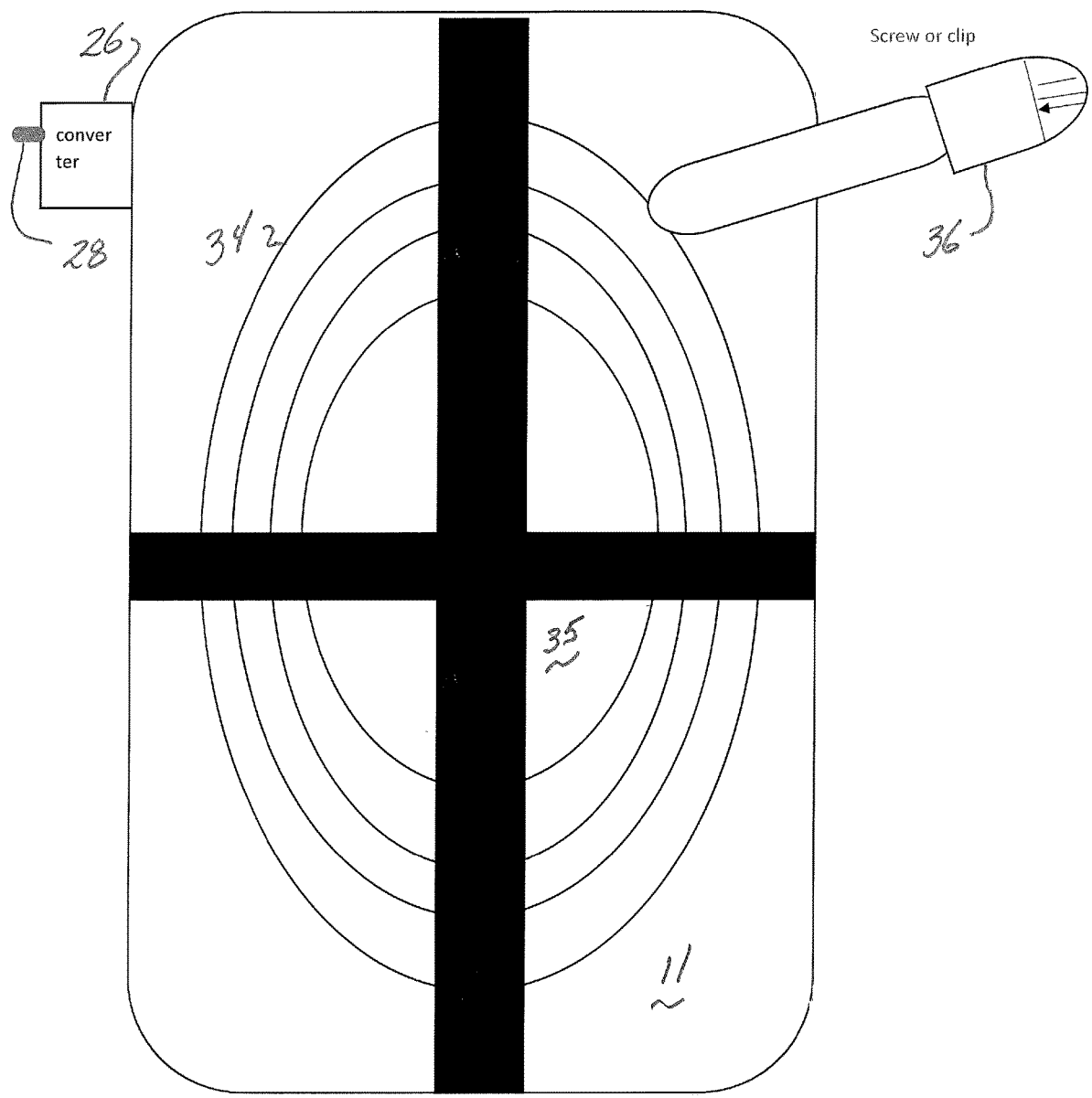

As shown in FIG. 1, cover plate 10 includes a rectangular shaped, generally vertically extending slot 24 extending down one side of the cover plate. The slot has semicircular central openings 24*u* and 24*l* formed along its upper and lower sides. As shown in FIG. 4, a charger 26 for charging electronic devices includes an AC/DC converter installed in electrical outlet 11 with plugs 28 of the converter being received in a receptacle 30 located on a back wall 32 of the outlet. This receptacle connects converter 26 to the same source of AC power as is connected to receptacles 12, 14. Charger 26 converts its AC electrical input to a DC voltage of a level required to charge personal electronic devices. As such, converter 26 can be one of a plurality of chargers such as are known in the art including those made, for example, by Apple® or Samsung® among others.

Again referring to FIG. 4, charger 26 includes an extendible and retractable cable or cord 34 mounted on a reel 35. Those skilled in the art will appreciate that cord 34 may be of different lengths for convenience of use. On the outer end of cord 34 is a connector 36 for attachment to the electronic device to be charged. Connector 36 can be an electrical connector which is inserted in an appropriate receptacle in a housing of the personal electronic device, a magnetic connector which magnetically couples with the personal electronic device, or other appropriate connector.

Figure 3:
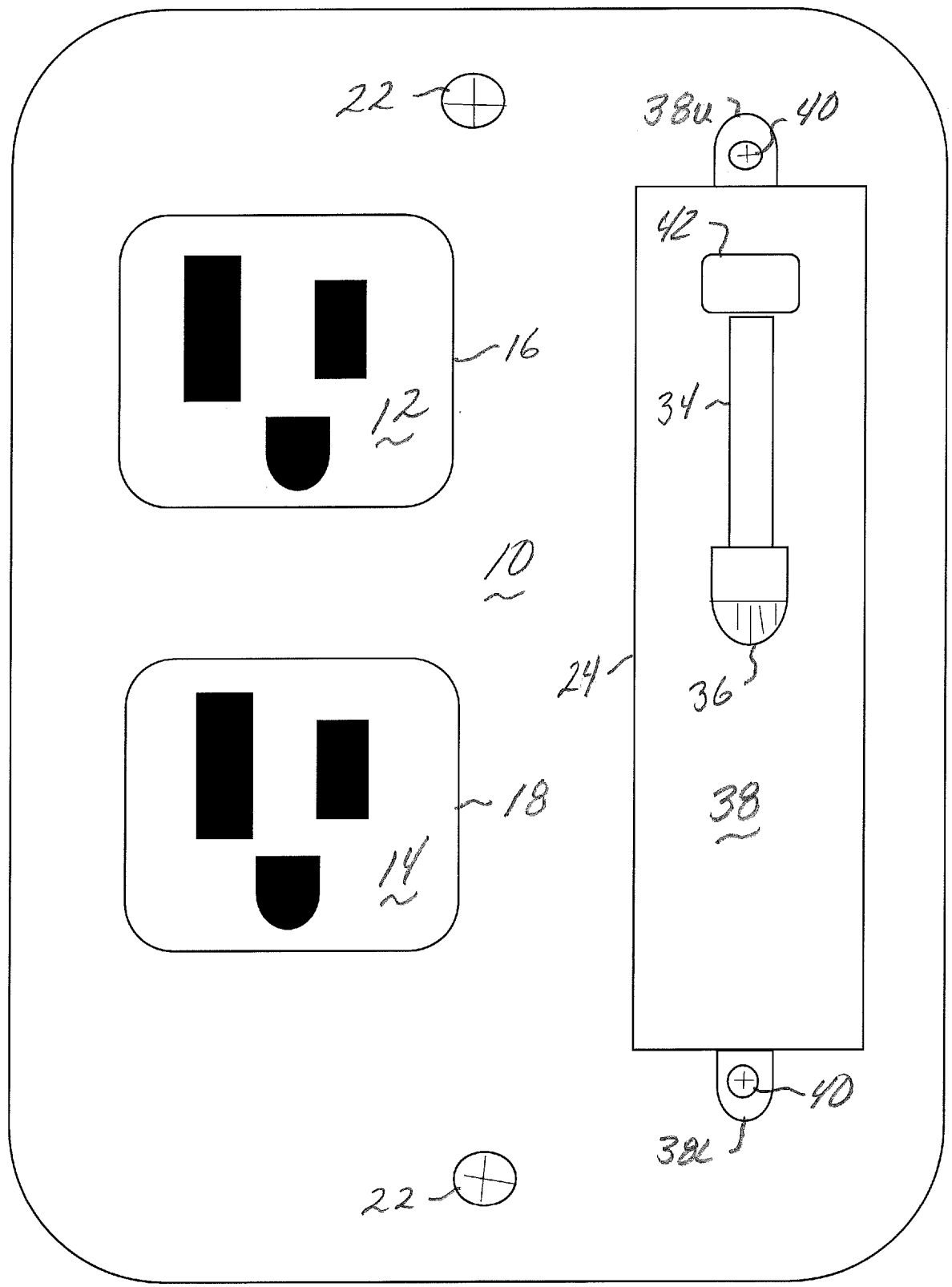
FIG. 3 is a front elevation view of the electrical outlet with the cover plate installed; and, FIG. 4 is a side elevation view of the outlet illustrating the charger installation.

As shown in FIG. 3, a rectangular shaped plate 38 is sized to fit over slot 24 so to enclose converter 26 and cord 34 within electrical outlet 11. Plate 38 has upper and lower tabs 38u and 38l which cover the respective openings 24u and 24l. Openings formed in the tabs accommodate screws 40 used to secure plate 38 to cover plate 10. Plate 38 further has a projection 42 extending outwardly from the front of the plate near the upper end of the plate. An outer end of cord 34 and connector 36 fit through this projection so to lie on the outside of plate 38. This exposure allows a user to grasp the cable or connector and extend it outwardly a convenient distance for connection to the device to be charged. When charging is complete, and the device disconnected from connector 36, cable 34 will retract to position as shown in FIG. 3 in which the cable rests flush with the cover plate to present a clean appearance.

Cover plate 10 is a low cost piece which is readily installed to an electrical outlet. The cover plate can be one of a range of colors so to fit in with any special décor for the area where the electrical outlet to which it is attached is situated.

In view of the above, it will be seen that the several objects and advantages of the present disclosure have been achieved and other advantageous results have been obtained.

The invention claimed is:

1. An electrical outlet cover for use in place of a conventional electrical outlet cover comprising:
   a cover plate sized to fit over an opening in a wall where an electrical outlet is installed to cover the opening made in the wall for the outlet, the cover plate having at least one opening therein for exposing an electrical receptacle to which an electrical appliance is connected for powering the appliance;
   a slot formed in the cover plate and forming an opening for an electronic device charger and its associated cord to be housed in the electrical outlet; and,
   a plate covering the slot and having a projection formed thereon through which an outer end of the cord extends, a connector on the outer end of the cord attaching to an electronic device for charging the electronic device.

2. The electrical outlet cover of claim 1 in which the electrical outlet over which the cover plate is installed has two electrical receptacles and the cover plate includes respective openings sized to expose the respective electrical receptacles when the cover plate is in place.

3. The electrical outlet cover of claim 1 in which the cover plate is made of a metal or a plastic.

4. An electrical outlet comprising:
   at least one electrical receptacle to which an electrical appliance is connected for powering the appliance;
   an electrical charger for an electronic device and an associated cord housed in the outlet;
   a cover plate sized to fit over an open end of the electrical outlet to cover the outlet, the cover plate having an opening exposing the at least one electrical receptacle for an electrical appliance to be connected to the outlet to power the appliance;
   a second and separate opening formed in the cover plate to expose the portion of the electrical outlet in which the charger and cord are housed; and,
   a plate covering the second opening, the plate having a projection formed thereon through which an outer end of the cord extends with a connector on the outer end of the cord attaching to an electronic device for charging the electronic device.

5. The electrical outlet of claim 4 wherein the cord is extendibly and retractedly mounted on a reel for the cord be extended away from the electrical outlet when a user wants to use the cord to connect to and charge an electronic device and retracted onto the reel after charging is completed.

6. The electrical outlet of claim 5 including an electrical connector at the outer end of the cord, the electrical connector being an electrical connector which is inserted in an appropriate slot in a housing of the electronic device, a magnetic connector which magnetically couples with the electronic device, or other appropriate connector.

\* \* \* \* \*